United States Patent
Matsunaga et al.

(10) Patent No.: US 12,085,470 B2
(45) Date of Patent: Sep. 10, 2024

(54) BOLT TIGHTENING TORQUE MANAGEMENT STRUCTURE AND METHOD

(71) Applicant: Nippon Telegraph and Telephone Corporation, Tokyo (JP)

(72) Inventors: Eri Matsunaga, Musashino (JP); Tadashi Minotani, Musashino (JP); Masayuki Tsuda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 224 days.

(21) Appl. No.: 17/797,918

(22) PCT Filed: Feb. 7, 2020

(86) PCT No.: PCT/JP2020/004813
§ 371 (c)(1),
(2) Date: Aug. 5, 2022

(87) PCT Pub. No.: WO2021/157055
PCT Pub. Date: Aug. 12, 2021

(65) Prior Publication Data
US 2023/0081045 A1 Mar. 16, 2023

(51) Int. Cl.
*G01L 5/24* (2006.01)
(52) U.S. Cl.
CPC ...................... *G01L 5/24* (2013.01)
(58) Field of Classification Search
None
See application file for complete search history.

(56) References Cited

U.S. PATENT DOCUMENTS

| 7,293,466 | B2 * | 11/2007 | Ohta | G01L 5/0004 |
| | | | | 73/761 |
| 7,467,556 | B2 * | 12/2008 | Kibblewhite | F16B 25/10 |
| | | | | 73/761 |
| 7,766,547 | B2 * | 8/2010 | Weppenaar | G01L 9/0072 |
| | | | | 73/866.5 |

(Continued)

OTHER PUBLICATIONS

Nabeya Bi-tech Kaisha, *Episode 7 Screw Tightening Management Method*, literature, Dec. 2, 2019 (reading day), https://www.nbk1560.com/products/specialscrew/nedzicom/topics/07_torque_management/, pp. 1-4.

*Primary Examiner* — Peter J Macchiarolo
*Assistant Examiner* — Jermaine L Jenkins
(74) *Attorney, Agent, or Firm* — Workman Nydegger (57) ABSTRACT

A bolt tightening torque management structure for a bolt for fastening a component includes: the bolt including a plurality of projections of different heights on a bearing surface of a head; a non-conductive film that is formed on the surface of the component, has a shaft hole through which a shaft of the bolt extends, and has a predetermined size; and a conductive film that has the shaft hole and a plurality of grooves, through which the projections extend, is formed on the non-conductive film, and has the same planar shape as the non-conductive film. The projections other than the projection having the smallest height are configured to be in contact with the surface of the component when the tightening torque of the bolt is appropriate. The base of each projection has a width dimensioned to close the corresponding groove.

12 Claims, 12 Drawing Sheets

(56) References Cited

U.S. PATENT DOCUMENTS

| | | | |
|---|---|---|---|
| 9,483,674 B1* | 11/2016 | Fink | G06K 7/10366 |
| 11,499,582 B2* | 11/2022 | Sato | G06K 19/07749 |
| 2022/0268599 A1* | 8/2022 | Matsunaga | F16B 31/02 |

* cited by examiner

BOLT TIGHTENING TORQUE MANAGEMENT STRUCTURE AND METHOD

TECHNICAL FIELD

The present invention relates to a bolt tightening torque management structure and a method thereof.

BACKGROUND ART

Bolts are used to fix structures in various applications such as large facilities, including infrastructure facilities and plants, vehicles, playground equipment, and furniture. For safe operation of facilities and the like, the bolts need to be tightened with appropriate torque.

Generally, a torque wrench is used to manage the tightening torque. The method of managing the tightening torque with a torque wrench is called the torque method. Examples of other methods include the torque gradient method and the angle of rotation method (NPL 1).

CITATION LIST

Non Patent Literature

[NPL 1] Vol. 7 Screw Tightening Control Methods, [Searched on Dec. 27, 2019], Internet (https://www.nbk1560.com/products/specialscrew/nedzicom/topics/07_t orque_management/)

SUMMARY OF THE INVENTION

Technical Problem

However, the conventional torque management methods all largely depend on the operator and thus have a problem that it is not possible to objectively manage whether a bolt is fastened with appropriate torque. For example, if the torque wrench is set incorrectly, the bolt tightening failure would be overlooked. That is, a cross-check is not possible, and there has been no structure or method for a third person to objectively manage the tightening torque of a bolt.

In view of this problem, it is an objective of the present invention to provide a bolt tightening torque management structure and a method thereof that can objectively manage whether a bolt is fastened with appropriate torque.

Means for Solving the Problem

A bolt tightening torque management structure according to an embodiment of the present invention, which is a bolt tightening torque management structure for a bolt for fastening a component, includes: a bolt including a plurality of projections of different heights on a bearing surface of a head; a non-conductive film that is formed on a surface of the component, has a shaft hole through which a shaft of the bolt extends, and has a predetermined size; and a conductive film that has the shaft hole and a plurality of grooves through which the projections extend, is formed on the non-conductive film, and has the same planar shape as the non-conductive film. The projections other than the projection having the smallest height are configured to be in contact with the surface of the component when the tightening torque of the bolt is appropriate, and the base of each projection has a width dimensioned to close the corresponding groove.

A method for managing a tightening torque of a bolt according to one embodiment of the present invention, which is a method for managing a tightening torque of a bolt for fastening a component, includes: a film forming step of forming a non-conductive film that is formed on a surface of the component, has a shaft hole through which a shaft of the bolt extends, and has a predetermined size, and a conductive film that is formed on the non-conductive film, has grooves through which the shaft of the bolt and a plurality of projections formed on a bearing surface of a head of the bolt extend, and has the same planar shape as the non-conductive film; a high-frequency signal application step of sweeping and applying a high-frequency signal having a frequency in a predetermined range to the conductive film; an appropriate tightening torque search step of detecting three vibration modes in a process of tightening the bolt until the projection having the smallest height comes into contact with the surface of the component; and a bolt tightening step of tightening the bolt so as to obtain the middle one of the vibration modes in the frequency range recorded in the appropriate tightening torque search step.

A method for managing a tightening torque of a bolt according to another embodiment of the present invention, which is a method for managing a tightening torque of a bolt for fastening a component, includes: a film forming step of forming a non-conductive film that is formed on a surface of the component, has a hole through which a shaft of the bolt extends, and has a predetermined size, and a conductive film that has grooves through which the shaft of the bolt and a plurality of projections of different heights formed on a bearing surface of the bolt extend, is formed on the non-conductive film, and has a same planar shape as the non-conductive film; a high-frequency signal application step of sweeping and applying a high-frequency signal having a frequency in a predetermined range to the conductive film; and a tightening torque managing step of sweeping and applying a high-frequency signal having a frequency in a predetermined range between the component and a bolt having a plurality of projections of different heights on a bearing surface of a head, and stopping the tightening of the bolt when the frequency of the detected vibration mode falls in a predetermined frequency range recorded in advance.

Effects of the Invention

According to the present invention, it is possible to objectively manage whether the bolt is fastened with appropriate torque.

BRIEF DESCRIPTION OF DRAWINGS

FIG. 12 is a diagram schematically showing a modification of the bolt shown in FIG. 1, (a) is a front view, (b) is a back view as viewed from the shaft side, and (c) is a cross-sectional view taken along line B-B in (b).

DESCRIPTION OF EMBODIMENTS

Referring to the drawings, embodiments of the present invention are now described. The same reference numerals are given to the same objects in a plurality of drawings, and their descriptions are not repeated.

Torque Management Structure

Figure 1:
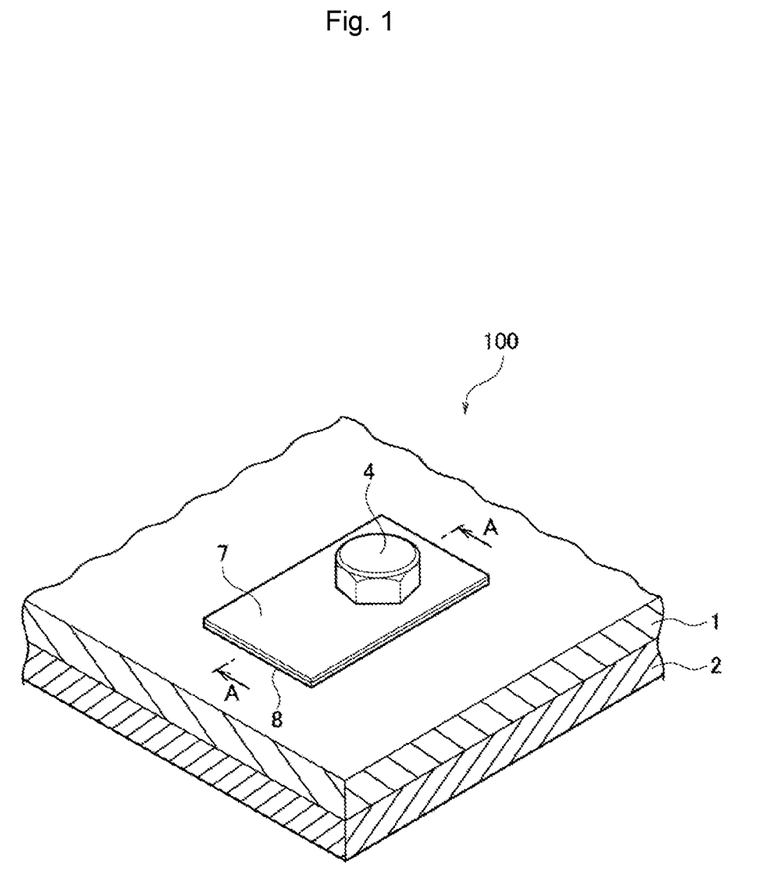
FIG. 1 is a perspective view showing an example of a bolt tightening torque management structure according to an embodiment of the present invention.

FIG. 1 is a perspective view showing an example of a bolt tightening torque management structure according to an embodiment of the present invention. Hereinafter, the "bolt tightening torque management structure" is abbreviated to "torque management structure".

A torque management structure 100 shown in FIG. 1 is a structure used for the purpose of managing the tightening torque of a bolt for fastening components. FIG. 1 shows an example of fastening two components 1 and 2 with a bolt 4.

As shown in FIG. 1, the torque management structure 100 includes the bolt 4, a non-conductive film 8, and a conductive film 7. The components 1 and 2 are, for example, steel materials. The non-conductive film 8 is formed on a surface of the component 1, has a shaft hole through which the shaft of the bolt 4 extends, and has a predetermined size. The conductive film 7 is formed on the non-conductive film 8 and has the same planar shape as the non-conductive film 8.

The torque management structure 100 is not limited to the example in which the bolt 4 fastens the two components 1 and 2. For example, it can be used to fix a certain product B (for example, a handrail) to another product A (for example, a staircase).

Figure 2:
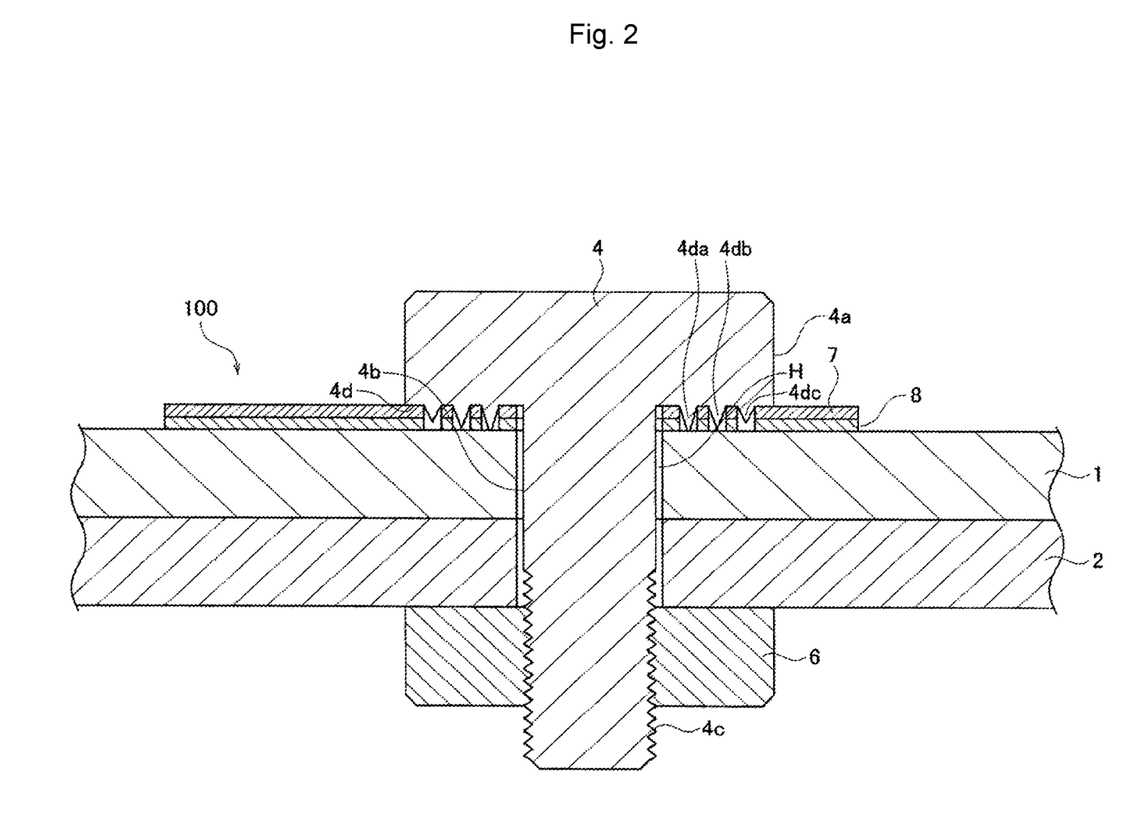
FIG. 2 is a diagram schematically showing a structural cross-sectional view taken along line A-A shown in FIG. 1.

FIG. 2 is a diagram schematically showing a structural cross-sectional view taken along line A-A in FIG. 1. FIG. 2 showing the bolt 4 is defined as the front view of the bolt 4.

As shown in FIG. 2, a nut 6 may be tightened on a thread section 4c of the bolt 4 to fasten the components 1 and 2. The nut 6 may be omitted. When the component 2 is threaded, the nut 6 is unnecessary. Furthermore, a washer (not shown) may be arranged between the nut 6 and the component 2.

The bolt 4 includes a plurality of projections 4da, 4db, and 4dc of different heights on a bearing surface 4d of a head 4a. When the positions of the projections 4da, 4db, and 4dc need to be specified, a suffix (number) is added to the reference numeral of each projection. When the specification of the positions of the projections 4da, 4db, and 4dc is not necessary, the suffixes are omitted as in FIG. 2.

The non-conductive film 8 is formed on the surface of the component 1, has a shaft hole H through which the shaft 4b of the bolt 4 extends, and has a predetermined size. For example, the non-conductive film 8 is urethane or epoxy resin having high weather resistance. The non-conductive film 8 is formed on the surface of the component 1 by painting or the like and has a thickness of about several hundred μm.

The conductive film 7 and the non-conductive film 8 have the shaft hole H and a plurality of grooves 7a, 7b, and 7c and grooves 8a, 8b, and 8c through which the respective projections 4da, 4db, and 4dc extend. In FIG. 2, the reference numerals of the grooves 7a to 7c and the grooves 8a to 8c are omitted to avoid complexity. The conductive film 7 may be formed by applying a conductive paint. For example, the conductive paint may be silver paste or the like.

In the example shown, the grooves 7a to 7c and the grooves 8a to 8c extend through in the thickness direction, but these grooves do not have to extend through the films. They may have a shape that is typically described as a groove (does not extend through).

Figure 3:
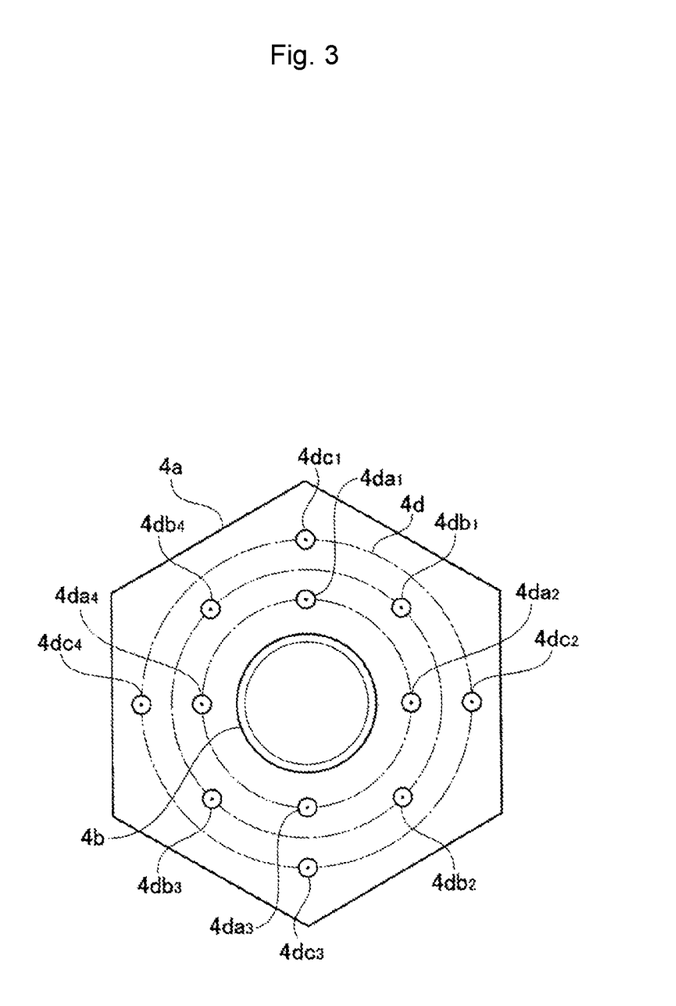
FIG. 3 is a diagram showing the back surface of the bolt shown in FIG. 2 as viewed in an axial direction.

FIG. 3 is a back view of the bolt 4 as viewed from the side on which the shaft 4b is located. As shown in FIG. 3, the projections 4da, 4db, and 4dc are arranged concentrically with respect to the shaft 4b.

In this example, a total of four projections 4da ($4da_1$, $4da_2$, $4da_3$, and $4da_4$) are provided, one on each of straight lines crossing perpendicularly at the center of the shaft 4b. For example, the projections $4da_1$, $4da_2$, $4da_3$, and $4da_4$ are arranged on one of the concentric circles that is the closest to the shaft 4b, and have the greatest height (FIG. 2).

Four projections 4db ($4db_1$, $4db_2$, $4db_3$, and $4db_4$) are provided at positions offset by 45 degrees from the projections 4da. The projections $4db_1$, $4db_2$, $4db_3$, and $4db_4$ are arranged at the outer side of the projections 4da, and have a smaller height than the projections 4da.

A total of four projections 4dc ($4dc_1$, $4dc_2$, $4dc_3$, and $4dc_4$) are provided, one on each of the same central axes as the projections 4da. The projections $4dc_1$, $4dc_2$, $4dc_3$, and $4dc_4$ are arranged at the outer side of the projections 4db and have the smallest height.

As is clear from FIGS. 3 and 2, the shape of each projection 4da, 4db, 4dc may be conical, for example. That is, the projection 4da, 4db, 4dc is formed such that the side corresponding to the bearing surface 4d is thick and the tip is thin. Also, the heights of the projections 4da, 4db, and 4dc increase toward the shaft 4b of the bolt 4.

Furthermore, the projections 4da, 4db, and 4dc are formed so as to be evenly arranged on the bearing surface 4d. Since the projections 4da, 4db, and 4dc are evenly arranged, the shaft 4b of the bolt 4 does not tilt when inserted into the shaft hole H. This allows the bolt 4 to be tightened straight relative to the components 1 and 2.

As the bolt 4 is tightened, the projections 4da, 4db, and 4dc come into contact with the surface of the component 1, are crushed at the tip portions, and thus become smaller in height according to the tightening torque of the bolt 4. The tip portions are crushed when the material of the bolt 4 is softer than that of the component 1.

In the example described below, the material of the bolt 4 is softer than that of the component 1. When the material of the bolt 4 is harder than that of the component 1, the tips of the bolt 4 bite into the surface of the component 1. The advantageous effects described below are achieved also with a configuration in which the tips of the bolt 4 bite into the component 1.

Figure 4A:
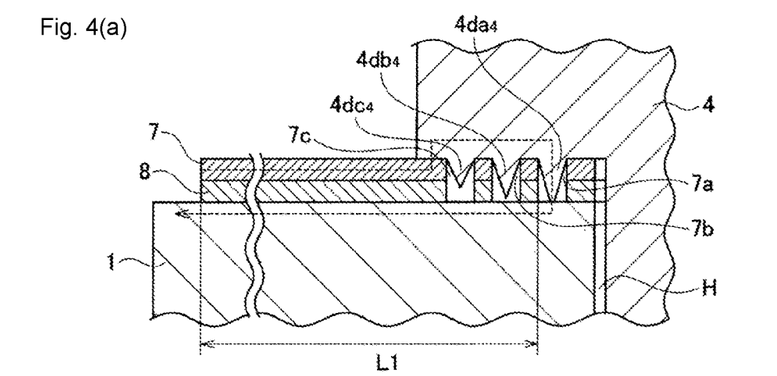
FIG. 4 is a diagram schematically showing changes in the shapes of projections corresponding to the degree of tightening of the bolt.
Figure 4B:
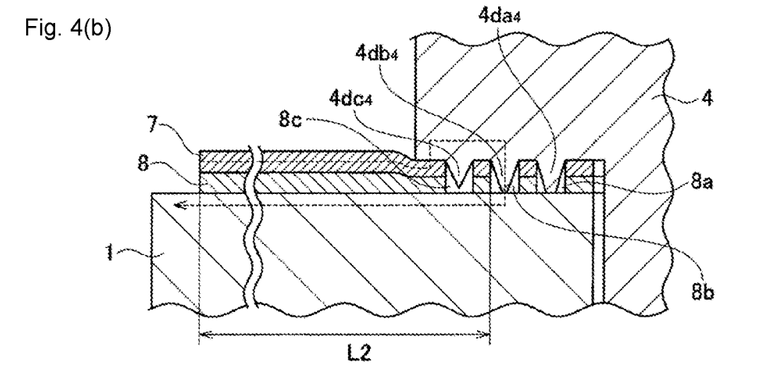
Figure 4C:
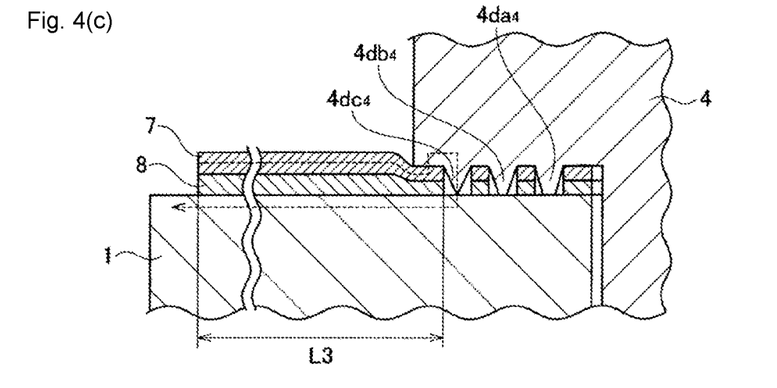

FIG. 4 is a diagram schematically showing changes in the shapes (taken along line A-A) of the projections 4da, 4db, and 4dc corresponding to the degree of tightening of the bolt 4. (a) illustrates a state in which the torque is small, (b)

illustrates a state in which the torque is appropriate, and (c) illustrates a state in which the torque is excessively large.

As shown in FIG. 4(a), when the tightening torque is small, only the projection $4da_4$ comes into contact with the surface of the component 1. The grooves 7a, 7b, and 7c through which the respective projections $4da_4$, $4db_4$, and $4dc_4$ extend are formed in advance. The same applies to the grooves 8a, 8b, and 8c formed in the non-conductive film 8. The grooves 7a, 7b, and 7c of the conductive film 7 are closed by the bases of the respective projections $4da_4$, $4db_4$, and $4dc_4$ of the bolt 4.

For example, when a high-frequency signal is applied to the conductive film 7 at a position corresponding to the outer edge of the component 1 on line A-A, the high-frequency signal propagates along the path of the conductive film 7→the projection $4da_4$→ the component 1, which is indicated by the broken line. The length L1 of the non-conductive film 8 sandwiched between this path is the length of the dielectric including the air layers of the grooves 8c and 8b. The length of this dielectric varies corresponding to the degree of tightening of the bolt 4.

FIG. 4(b) shows a state in which the tightening torque is appropriate. In this case, the projections $4da_4$ and $4db_4$ are in contact with the surface of the component 1, and the high-frequency signal propagates through the path of the conductive film 7→the projections $4db_4$→the component 1. The length L2 of the non-conductive film 8 sandwiched between this path indicated by the broken line is the length of the dielectric including the air layer of the groove 8c.

FIG. 4(c) shows a state in which the tightening torque is excessively large. In this state, the projection $4dc_4$ is in contact with the surface of the component 1, and the high-frequency signal propagates through the path of the conductive film 7→the projection $4dc_4$→ the component 1. The length of the non-conductive film 8 sandwiched between the path indicated by the broken line is L3. The dielectric in this state does not include an air layer.

Figure 5:
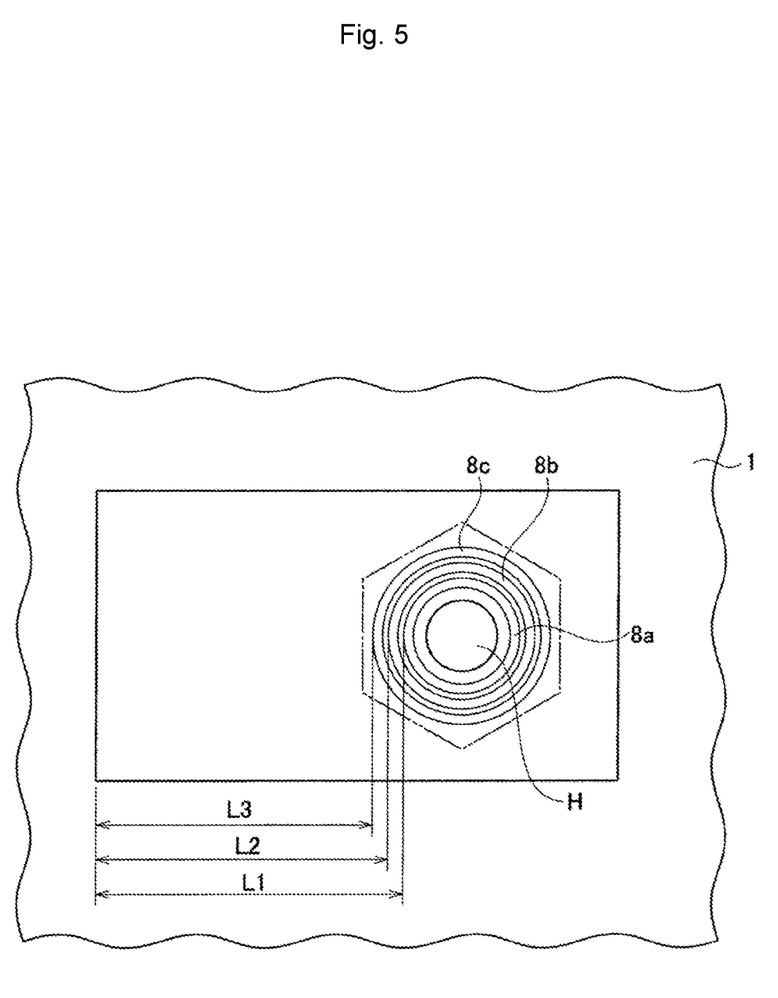
FIG. 5 is a diagram schematically showing lengths of a non-conductive film that vary corresponding to the degree of tightening of the bolt.

FIG. 5 is a diagram schematically showing the lengths of the dielectric (non-conductive film 8+air layer) that vary corresponding to the degree of tightening of the bolt. As shown in FIG. 5, the length L1 of the dielectric is the length including the air layers of the grooves 8c and 8b. The length L2 of the dielectric is the length including the air layer of the groove 8c. The length L1 of the dielectric is the length from one edge of the non-conductive film 8.

Figure 6A:
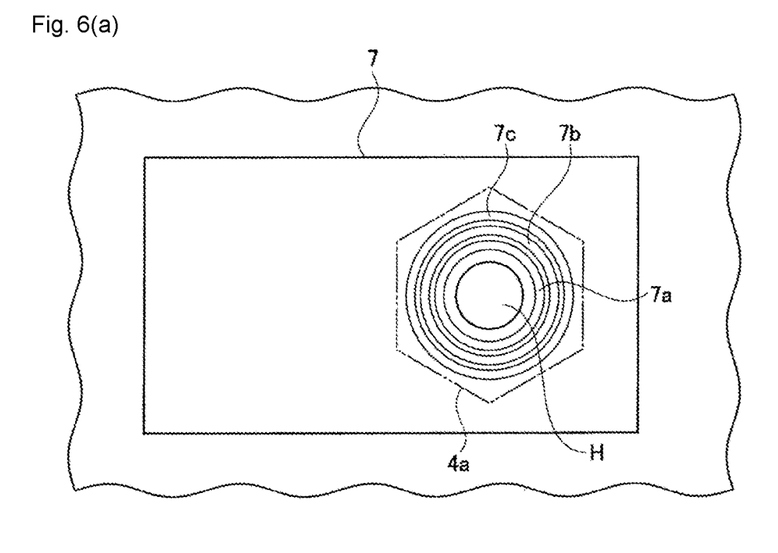
FIG. 6 is a diagram schematically showing an example of the planar shapes of the non-conductive film and the conductive film shown in FIG. 1.
Figure 6B:
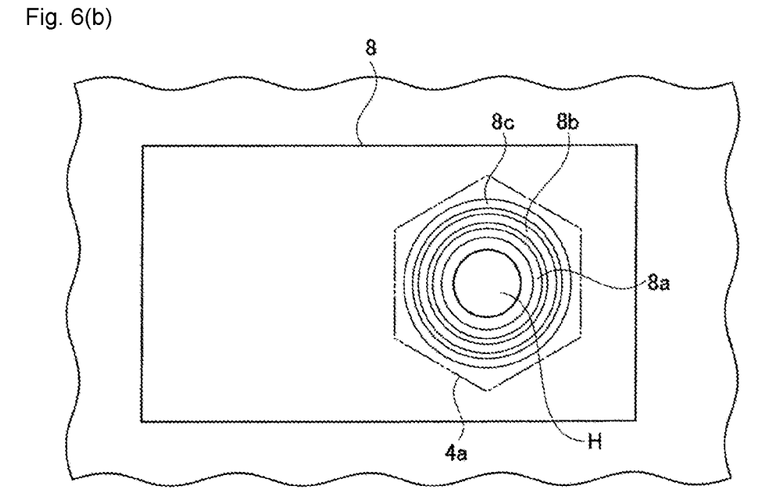

FIG. 6 is a diagram schematically showing an example of the planar shapes of the non-conductive film 8 and the conductive film 7. FIG. 6(a) shows the conductive film 7, and FIG. 6(b) shows the non-conductive film 8. FIG. 6(b) is the same as FIG. 5.

As shown in FIG. 6, the non-conductive film 8 and the conductive film 7 have the same planar shape. Nevertheless, the non-conductive film 8 and the conductive film 7 may have different planar shapes.

Figure 7A:
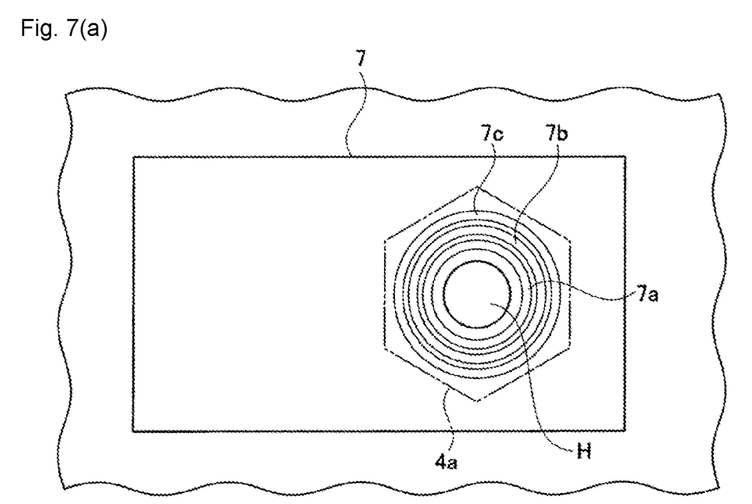
FIG. 7 is a diagram schematically showing another example of the planar shapes of the non-conductive film and the conductive film shown in FIG. 1.
Figure 7B:
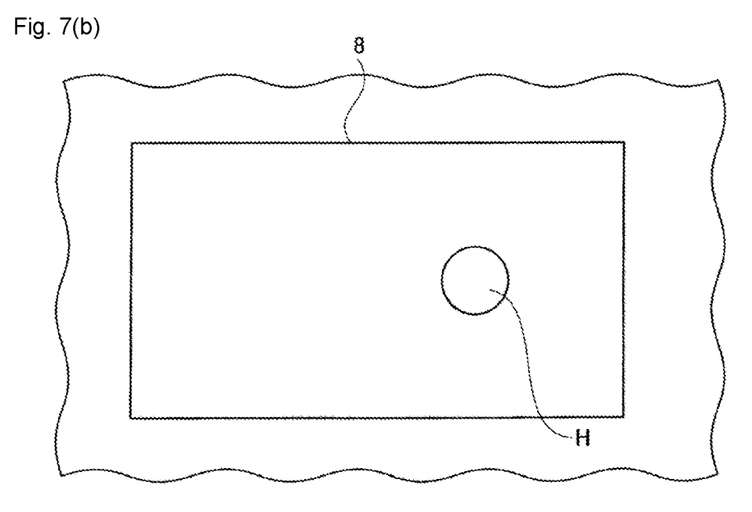

FIG. 7 shows an example in which the non-conductive film 8 has a planar shape that includes only the shaft hole H. FIG. 7(a) is the same as FIG. 6(a). As illustrated, the non-conductive film 8 may have a shape in which only the shaft hole H is formed.

The non-conductive film 8 shown in FIG. 7 will be scraped by the projections 4da, 4db, and 4dc as the bolt 4 is tightened, thereby changing into a planar shape that is similar to that of the non-conductive film 8 including the grooves 8a to 8c shown in FIG. 6(b). As such, when the material of the non-conductive film 8 is softer than the projections 4da to 4dc, it is not necessary to form the grooves 8a to 8c in advance. The same applies to the grooves 7a to 7c of the conductive film 7.

As described above, the torque management structure according to the present embodiment is a bolt tightening torque management structure for a bolt for fastening a component and includes: the bolt 4 including a plurality of projections 4da, 4db, and 4dc of different heights on the bearing surface 4d of the head 4a; the non-conductive film 8 that is formed on the surface of the component 1, has the shaft hole H through which the shaft 4b of the bolt 4 extends, and has a predetermined size; and the conductive film 7 that has the shaft hole H and a plurality of grooves 7a, 7b, and 7c through which the projections 4da, 4db, and 4dc extend, is formed on the non-conductive film 8, and has the same planar shape as the non-conductive film 8. The projections 4da and 4db other than the projection 4dc having the smallest height are configured to be in contact with the surface of the component 1 when the tightening torque of the bolt 4 is appropriate. The base of each projection 4da, 4db, 4dc has a width dimensioned to close the corresponding groove 7a, 7b, 7c. According to the present invention, it is possible to objectively manage whether the bolt 4 is fastened with appropriate torque.

When the surface of the component 1 includes an insulator, a second conductive film 9 (not shown) is provided on the surface of the component 1 to face the conductive film 7. Since the second conductive film 9 needs to be conductive with the projections 4da to 4dc, the second conductive film 9 does not have to include a groove. The insulator may be a coating film of paint, for example. The insulator may have a low conductivity. In this manner, the non-conductive film 8 is configured to be sandwiched between conductors.

A high-frequency signal is swept in a predetermined frequency range and applied to the conductive film 7 from the outside. The frequency (resonance frequency) of the applied high-frequency signal is partially confined in the non-conductive film 8. The resonance frequency confined in the non-conductive film 8 changes corresponding to the tightening of the bolt 4. Thus, the tightening torque of the bolt 3 can be managed by measuring the change in the resonance frequency confined in the non-conductive film 8. The torque management method will be described below.

Figure 8:
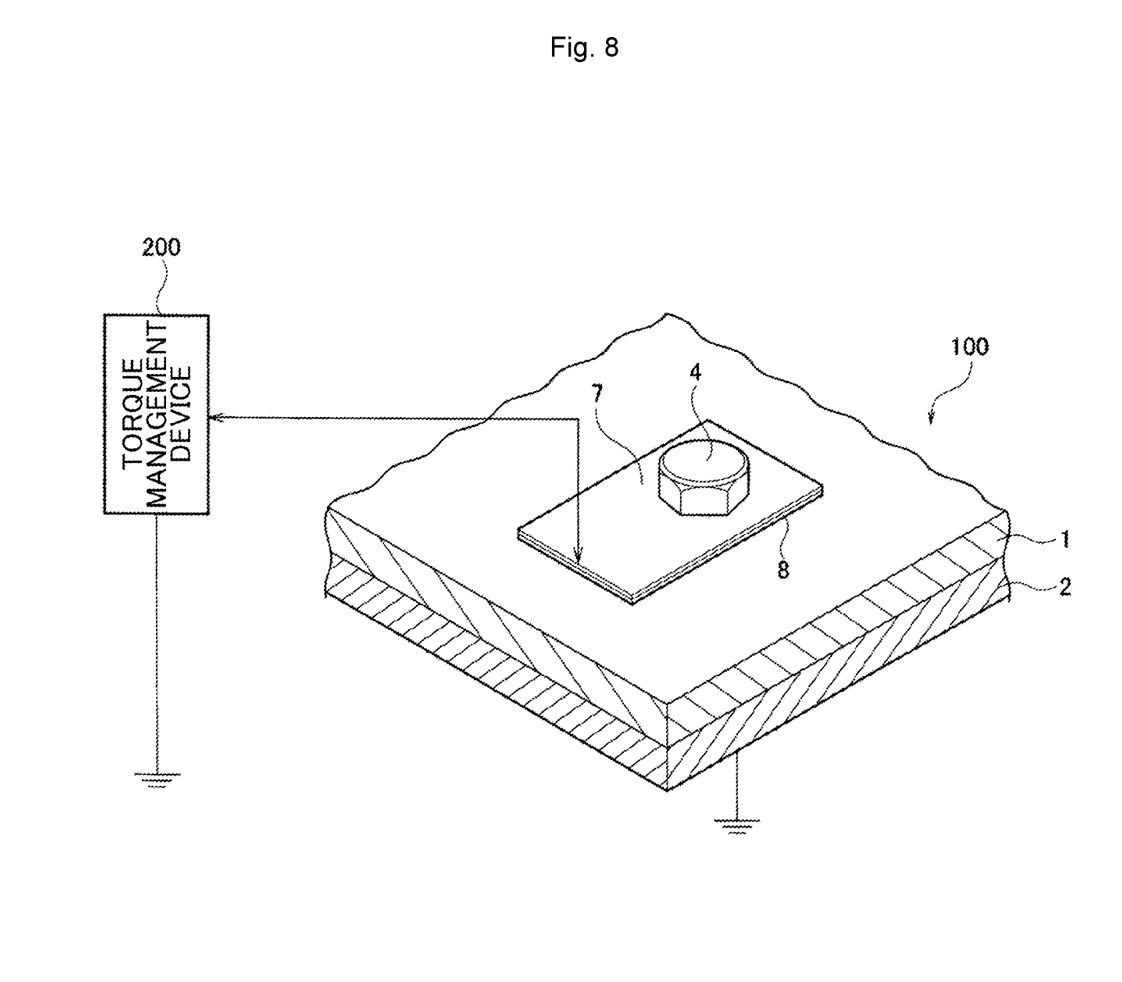
FIG. 8 is a schematic view showing a torque management structure and a torque management device according to an embodiment of the present invention.

FIG. 8 is a schematic view showing a torque management structure 100 and a torque management device 200 according to the present embodiment. The torque management device 200 sweeps and applies a high-frequency signal to the conductive film 7 to detect the resonance frequency confined in the non-conductive film 8.

Torque Management Device

Figure 9:
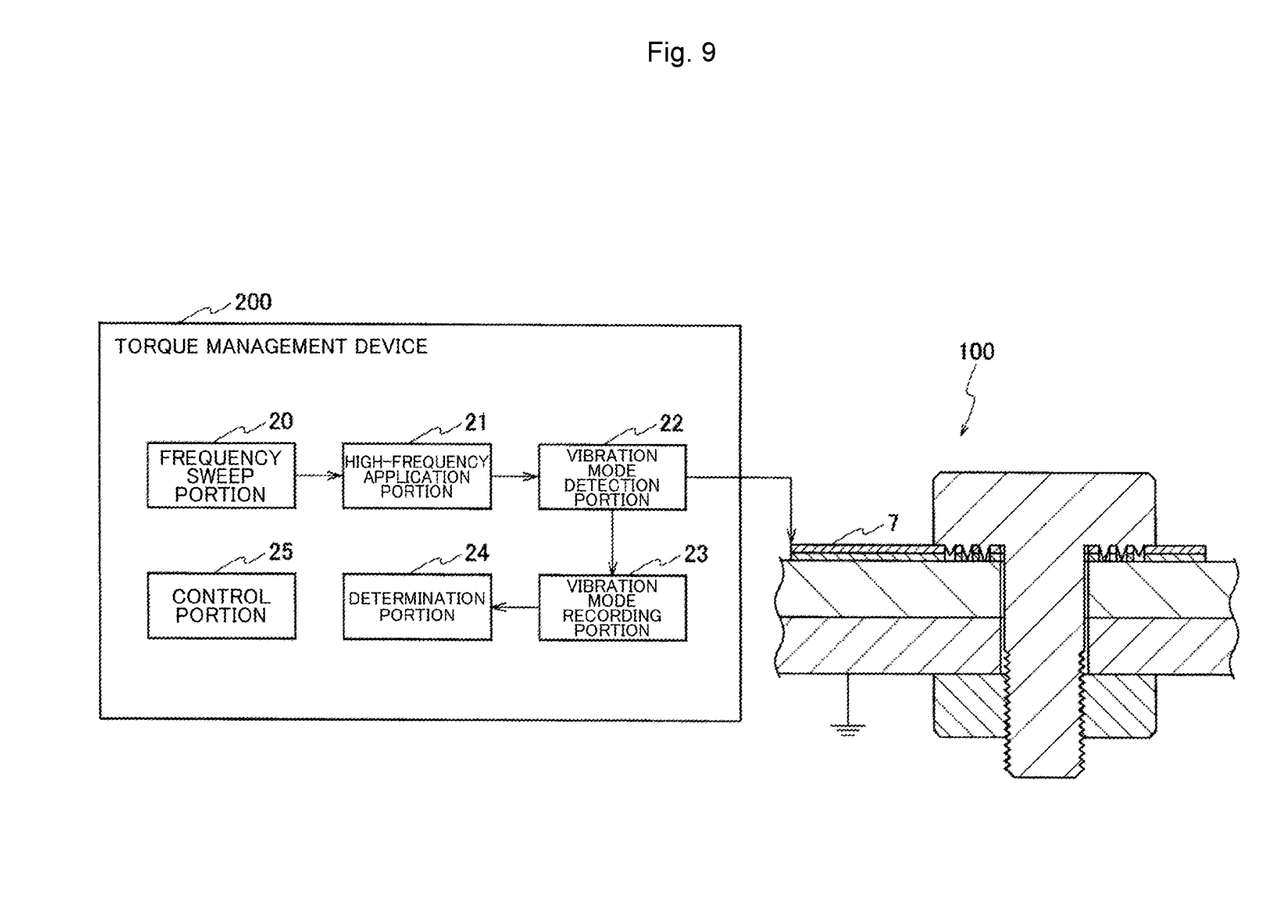
FIG. 9 is a block diagram showing a functional configuration example of a torque management device according to an embodiment of the present invention.

FIG. 9 is a block diagram showing an example of the functional configuration of the torque management device 200 according to the embodiment of the present invention.

The torque management device 200 includes a frequency sweep portion 20, a high-frequency application portion 21, a vibration mode detection portion 22, a vibration mode recording portion 23, a determination portion 24, and a control portion 25. The control portion 25 is a functional component portion that controls the operation of each function component portion, and may be formed by a computer such as a ROM, a RAM, or a CPU, for example. When the control portion 25 is formed by a computer, a part of the vibration mode detection portion 22, the vibration mode recording portion 23, and the determination portion 24 may also be formed by the computer.

The torque management device 200 inputs a high-frequency signal to the conductive film 7 of the torque management structure 100. The frequency sweep portion 20 sweeps the frequency in a predetermined range. The high-frequency application portion 21 generates a high-frequency signal of the frequency swept by the frequency sweep portion 20 and applies it to the conductive film 7 of the torque management structure 100.

The operator tightens the bolt 4 with a high-frequency signal being swept and applied to the conductive film 7.

The vibration mode detection portion 22 detects the vibration mode (resonance frequency) of the component 1 to which the conductive film 7 is attached. The vibration mode can be obtained, for example, by performing a fast Fourier (FFT) transform on the characteristics of the current input to the conductive film 7.

Alternatively, the reflected wave reflected from the conductive film 7 may be subjected to fast Fourier transform to detect the vibration mode. For the detection using the reflected wave, the vibration mode detection portion 22 is connected in series between the conductive film 7 and the vibration mode recording portion 23 (not shown).

The vibration mode recording portion 23 records the peak value of the vibration detected by the vibration mode detection portion 22. For example, the peak value of vibration can be obtained from the maximum value of the current input from the conductive film 7. The peak value may be represented by a current value and the frequency with which the current flows.

The operator keeps tightening the bolt 4 until three vibration modes are detected. The three vibration modes correspond to the state in which the torque is small in FIG. 4(a), the state in which the torque is appropriate in FIG. 4(b), and the state in which the torque is excessively large in FIG. 4(c).

The vibration mode recording portion 23 records the resonance frequency that is confined in the non-conductive film 7 when the torque is appropriate as in FIG. 4(b).

When the measured resonance frequency (the frequency of the vibration mode) matches the frequency measured when the torque is appropriate, the determination portion 24 determines that the tightening torque of the bolt 4 is appropriate. For the bolt 4 that is operated first, an operation is performed in which the bolt 4 is loosened since the tightening torque is excessively large and then the bolt 4 is tightened again.

For the second and subsequent bolts 4, the operator tightens the bolts 4 until the determination portion 24 determines that the tightening is appropriate. Accordingly, the tightening torque of the bolt 4 can be appropriately managed. Moreover, the bolt 4 that is already tightened can also be managed after the tightening by measuring the vibration mode (resonance frequency) of the torque management structure 100.

Figure 10:
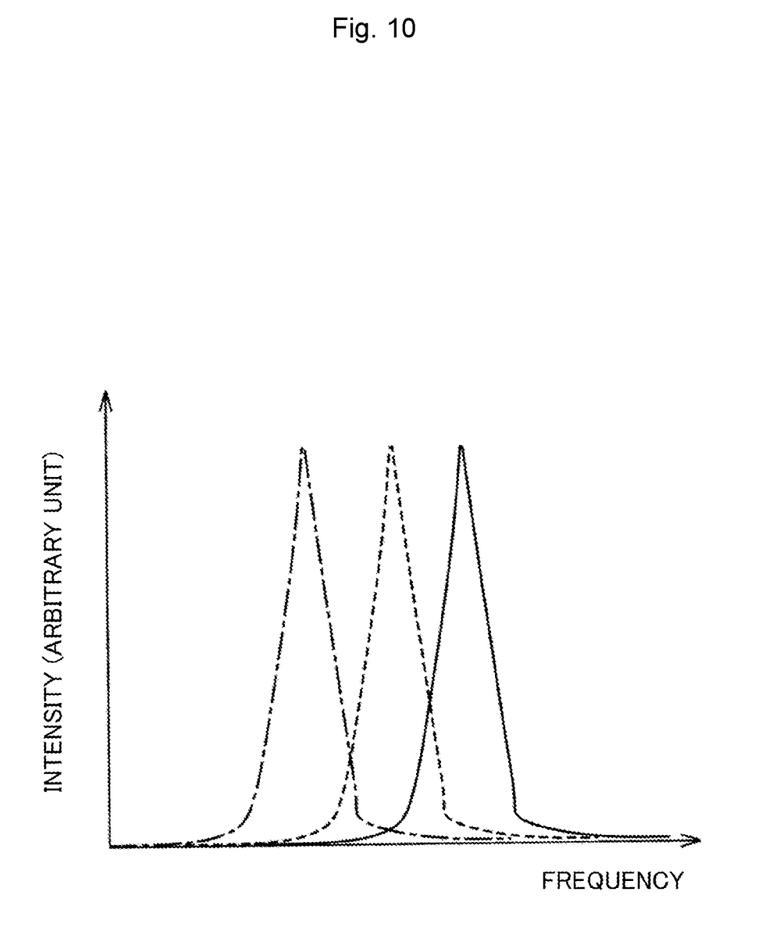
FIG. 10 is a diagram schematically showing how the resonance frequency changes corresponding to the tightening torque of the bolt.

FIG. 10 is a diagram schematically showing how the resonance frequency changes according to the tightening torque on the bolt. In FIG. 10, the horizontal axis of FIG. 10 represents the frequency, and the vertical axis represents the resonance intensity (arbitrary unit).

The frequency spectrum indicated by the dashed dotted line FIG. 10 shows a state in which the tightening torque of the bolt 4 is small. This frequency spectrum (dashed dotted line) corresponds to L1, which is the longest dielectric length (FIG. 4(a)).

The frequency spectrum indicated by the broken line shows a state in which the tightening torque of the bolt 4 is appropriate. This frequency spectrum (broken line) corresponds to L2, which is the middle dielectric length (FIG. 4(b)).

The frequency spectrum indicated by the solid line shows a state in which the tightening torque of the bolt 4 is excessively large. This frequency spectrum (solid line) corresponds to L3, which is the smallest dielectric length (FIG. 4(c)).

In this manner, it is possible to manage the tightening torque of the bolt 4 by measuring and recording the frequency spectrum of the bolt 4 that is fastened with an appropriate tightening torque in advance.

Torque Management Method

Figure 11:
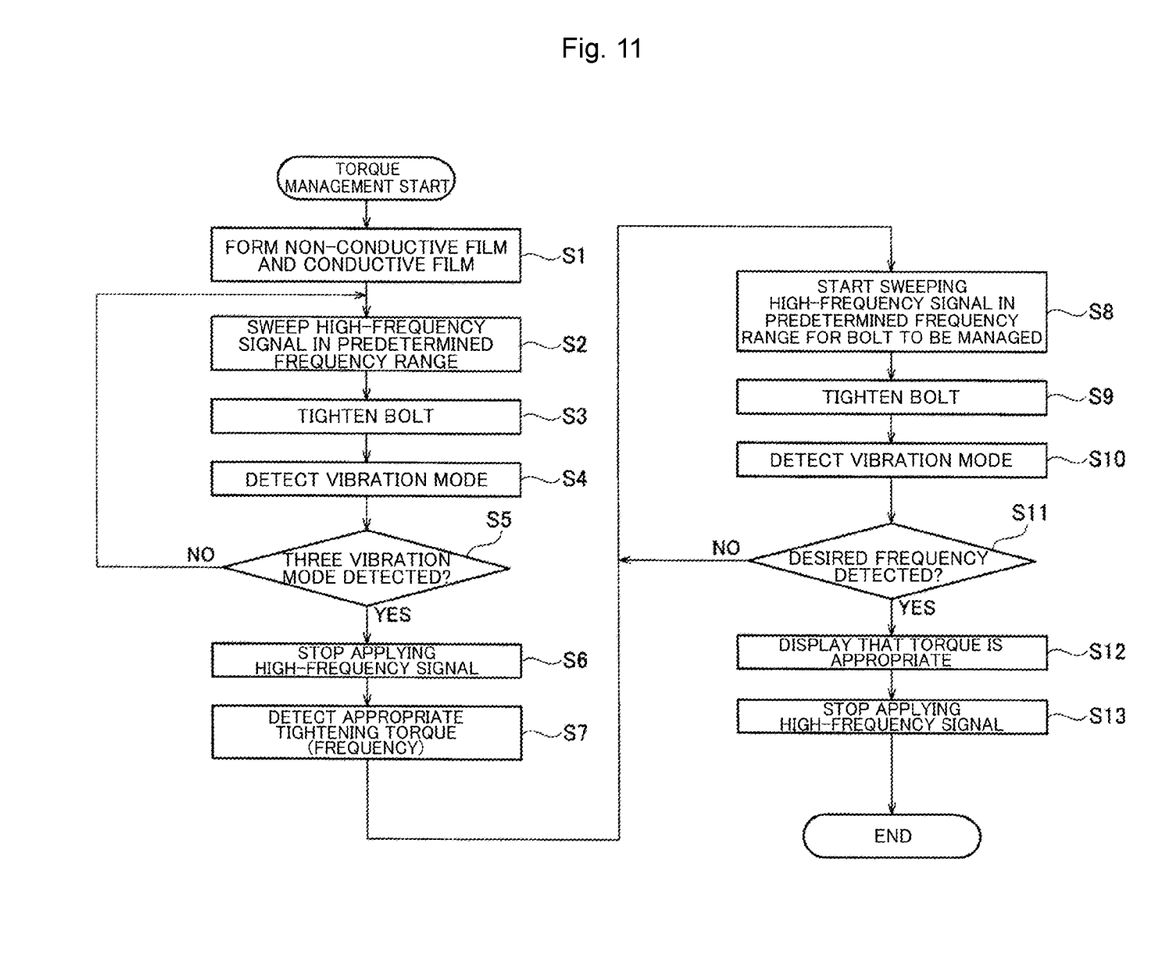
FIG. 11 is a flowchart showing a process procedure of a bolt tightening torque management method according to an embodiment of the present invention.

FIG. 11 is a flowchart showing the process procedure of a method for managing the tightening torque of a bolt using the torque management device 200 and the torque management structure 100.

To perform the torque management method according to an embodiment of the present invention, first, the non-conductive film 8 and the conductive film 7 are formed on the surface of the target component 1 (step 1). Each of the non-conductive film 8 and the conductive film 7 may be formed by painting, or sheets that are patterned as the films may be prepared and attached to the surface of the component 1.

Then, the frequency sweep portion 20 starts sweeping the frequency in a predetermined range. Then, the high-frequency application portion 21 generates a high-frequency signal of the frequency swept by the frequency sweep portion 20 and applies it to the conductive film 7 of the torque management structure 100 (step S2).

The operator tightens the bolt 4 with the high-frequency signal applied to the conductive film 7 (step S3).

The vibration mode detection portion 22 detects the vibration mode (resonance frequency) of the torque management structure 100 (step S4). The vibration mode detection portion 22 repeats steps S2 to S4 until three vibration modes (resonance frequencies) are detected (NO at step S5).

When three vibration modes (resonance frequencies) are detected, the frequency sweep portion 20 stops the sweeping and application of the high-frequency signal (step S6). The vibration mode detection portion 22 records the frequency around the median of the three resonance frequencies in the vibration mode recording portion 23 as the frequency measured when the tightening torque is appropriate (step S7).

Then, the frequency sweep portion 20 restarts the sweeping of the frequency in the predetermined range (step S8).

The operator tightens another bolt 4 to be managed (step S9).

The vibration mode detection portion 22 detects the vibration mode (resonance frequency) of the torque management structure 100 (step S10). The vibration mode detection portion 22 repeats steps S8 to S10 until the resonance frequency recorded at step S7 is detected (NO at Step S11).

When the frequency that corresponds to the appropriate tightening torque is detected, the determination portion 24 displays that the torque is appropriate (step S12). For this display, an LED (not shown) may be turned on. Alternatively, a speaker (not shown) or the like may issue a sound.

When it is detected that the tightening torque is appropriate, the frequency sweep portion 20 stops sweeping and applying the high-frequency signal (step S13).

As described above, the torque management method according to the present embodiment includes the following steps.

In a method for managing a tightening torque of a bolt for fastening a component 1, a step of forming a non-conductive film 8 that is formed on a surface of the component 1, has a shaft hole H through which a shaft 4b of the bolt 4 extends, and has a predetermined size, and a conductive film 7 that is formed on the non-conductive film 8, has grooves 8a, 8b, and 8c through which the shaft 4b of the bolt 4 and a plurality of projections 4da, 4db, and 4dc formed on the bearing surface 4d of the head 4a of the bolt 4 extend, and has the same planar shape as the non-conductive film 8 (S1)

A high-frequency signal application step of sweeping and applying a high-frequency signal having a frequency in a predetermined range to the conductive film 7, and a step of sweeping a high-frequency signal in a predetermined frequency range and applying it to the conductive film 7 (S2)

A step of detecting three vibration modes in a process (S2 to S5) of tightening the bolt 4 until the projection 4dc having the smallest height comes into contact with the surface of the component 1 (S5)

A step of tightening a bolt so as to obtain a middle frequency in the frequency range recorded at step 5 (YES at S11)

As a result, it is possible to objectively manage whether the bolt is fastened with appropriate torque.

When the resonance frequency obtained with a bolt 4 that is tightened with appropriate torque is known in advance, the process of steps S2 to S7 is not required. That is, only step S1, step S8, and the subsequent steps shown in FIG. 11 need to be performed.

In this case, the torque management method includes the following steps.

A step of forming a non-conductive film 8 that is formed on a surface of the component 1, has a shaft hole H through which the shaft 4b of the bolt 4 extends, and has a predetermined size, and a conductive film 7 that is formed on the non-conductive film 8, has grooves through which the shaft 4b of the bolt 4 and a plurality of projections 4da, 4db, 4dc of different heights formed on the bearing surface 4d of the bolt extend, and has the same planar shape as the non-conductive film 8 (S1)

A tightening torque managing step of sweeping and applying a high-frequency signal having a frequency in a predetermined range between the component 1 and a bolt having a plurality of projections 4da, 4db, 4dc of different heights on the bearing surface 4d of the head 4a, and stopping the tightening of the bolt when a frequency of a detected vibration mode falls in a predetermined frequency range.

Modification of Bolt

Figure 12A:
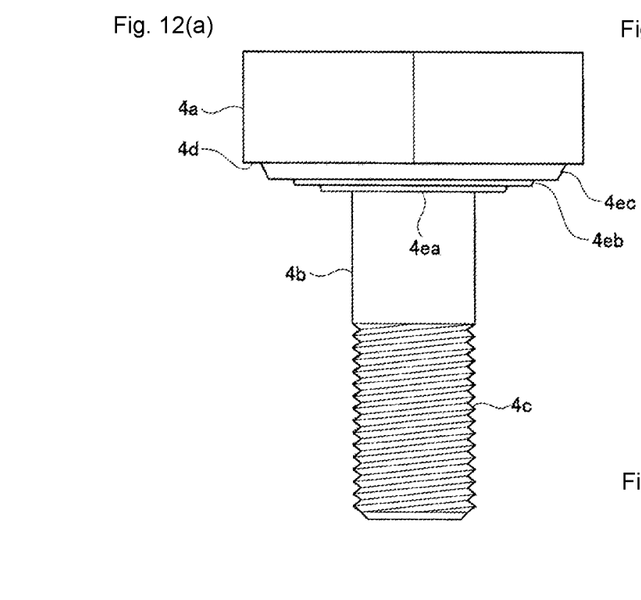
Figure 12B:
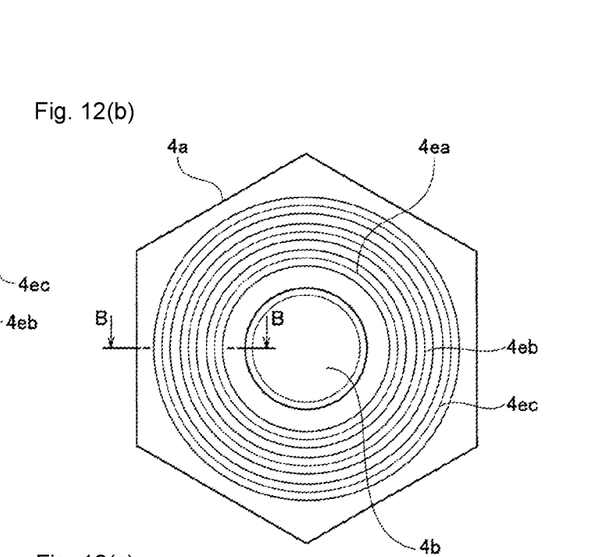
Figure 12C:
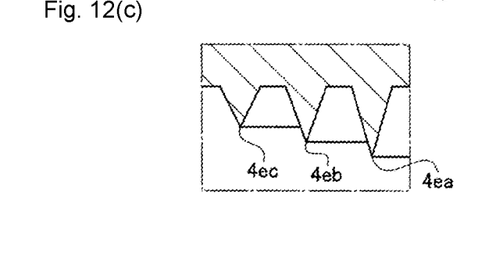

FIG. 12 is diagrams showing a modification of a bolt 4. (a) is a front view, (b) is a back view, and (c) is a cross-sectional view taken along line B-B in (b). As shown in FIG. 12, projections 4ea, 4eb, and 4ec may be formed in annular shapes. In FIG. 12, each annular ring is represented by three circles. The parts indicated by the leader lines each represent the thin tip of the annular ring.

The projection 4ea with the greatest height is formed concentrically at a position closest to the shaft 4b. The medium-height projection 4eb is formed concentrically at the outer side of the projection 4ea with a gap formed in between. The projection 4ec with the smallest height is formed concentrically at the outer side of the projection 4eb with a gap formed in between.

As shown in FIG. 12(c), the projections 4ea, 4eb, and 4ec each have a triangular cross-section such that the side corresponding to the bearing surface 4d of the bolt 4 has a greater width, the width decreases away from the bearing surface 4d, and the tip forms a point. The tip portion of the triangle is crushed depending on the tightening torque of the bolt 4, so that the height is reduced. Accordingly, the bolt 4 of the modification can obtain the same advantageous effects as described with reference to FIG. 4.

As described above, the projections 4ea, 4eb, and 4ec of the bolt 4 of the modification may be formed in annular shapes. The annular projections 4ea, 4eb, and 4ec can be easily formed using a lathe or the like. Thus, the bolt 4 of the modification reduces the cost.

As described above, according to the bolt tightening torque management structure 100 and the method thereof according to the present embodiment, the bolt tightening state can be checked at any time by detecting the vibration mode (resonance frequency). This enables a cross-check in which an operator can objectively check whether another operator has tightened a bolt with appropriate torque, not only at the time of installation but also after the bolt is installed. As a result, the safety management of the structure using bolts can be performed reliably and easily.

Although the above-described embodiment shows three types of projections, the present invention is not limited to these examples. Three or more types of projections may be used to perform more detailed torque management. As in the examples described above, this example also needs to be configured such that the projections other than the projection having the smallest height are in contact with the surface of the component 1 when the tightening torque of the bolt is appropriate.

Furthermore, in the above examples, the heights of the projections increase toward the shaft 4b of the bolt 4, but the configuration is not limited to these examples. The projection at the outermost section of the bearing surface 4d of the bolt 4 may be the highest. Alternatively, the middle projection may be the highest. That is, any configurations may be used as long as three or more vibration modes can be detected.

As described above, the present invention is not limited to the above-described embodiment, and can be modified within the scope of the invention.

REFERENCE SIGNS LIST 1, 2 Component
4 Bolt
4a Head
4b Shaft
4c Thread section
5 Washer
6 Nut
7 Conductive film
7a, 7b, 7c Groove
8 Non-conductive film
8a, 8b, 8c Groove
100 Bolt tightening torque management structure
20 Frequency sweep portion
21 High-frequency application portion
22 Vibration mode detection portion
23 Vibration mode recording portion
24 Determination portion
25 Control portion

The invention claimed is:

1. A bolt tightening torque management structure for a bolt for fastening a component, the bolt tightening torque management structure comprising:
   a bolt including a plurality of projections of different heights on a bearing surface of a head;

a non-conductive film that is formed on a surface of the component, has a shaft hole through which a shaft of the bolt extends, and has a predetermined size; and a conductive film that has the shaft hole and a plurality of grooves through which the projections extend, is formed on the non-conductive film, and has a same planar shape as the non-conductive film, wherein the projections other than the projection having a smallest height are configured to be in contact with the surface of the component when a tightening torque of the bolt is appropriate, and a base of each projection has a width dimensioned to close the corresponding groove.

2. The bolt tightening torque management structure according to claim 1, wherein heights of the projections increase toward the shaft of the bolt.

3. The bolt tightening torque management structure according to claim 2, wherein each projection is formed such that a side corresponding to the bearing surface is thick and a tip is thin.

4. The bolt tightening torque management structure according to claim 2, wherein the projections are arranged evenly on the bearing surface.

5. The bolt tightening torque management structure according to claim 2, wherein each projection has an annular planar shape.

6. The bolt tightening torque management structure according to claim 1, wherein each projection is formed such that a side corresponding to the bearing surface is thick and a tip is thin.

7. The bolt tightening torque management structure according claim 6, wherein the projections are arranged evenly on the bearing surface.

8. The bolt tightening torque management structure according to claim 6, wherein each projection has an annular planar shape.

9. The bolt tightening torque management structure according to claim 1, wherein the projections are arranged evenly on the bearing surface.

10. The bolt tightening torque management structure according to claim 1, wherein each projection has an annular planar shape.

11. A method for managing a tightening torque of a bolt for fastening a component, the method comprising:

a film forming step of forming a non-conductive film that is formed on a surface of the component, has a shaft hole through which a shaft of the bolt extends, and has a predetermined size, and a conductive film that is formed on the non-conductive film, has grooves through which the shaft of the bolt and a plurality of projections formed on a bearing surface of a head of the bolt extend, and has a same planar shape as the non-conductive film;

a high-frequency signal application step of sweeping and applying a high-frequency signal having a frequency in a predetermined range to the conductive film;

an appropriate tightening torque search step of detecting three vibration modes in a process of tightening the bolt until the projection having a smallest height comes into contact with the surface of the component; and a bolt tightening step of tightening the bolt so as to obtain the middle one of the vibration modes in a frequency range recorded in the appropriate tightening torque search step.

12. A method for managing a tightening torque of a bolt for fastening a component, the method comprising:

a film forming step of forming a non-conductive film that is formed on a surface of the component, has a hole through which a shaft of the bolt extends, and has a predetermined size, and a conductive film that has grooves through which the shaft of the bolt and a plurality of projections of different heights formed on a bearing surface of the bolt extend, is formed on the non-conductive film, and has a same planar shape as the non-conductive film;

a high-frequency signal application step of sweeping and applying a high-frequency signal having a frequency in a predetermined range to the conductive film; and a tightening torque managing step of sweeping and applying a high-frequency signal having a frequency in a predetermined range between the component and a bolt having a plurality of projections of different heights on a bearing surface of a head, and stopping the tightening of the bolt when a frequency of a detected vibration mode falls in a predetermined frequency range recorded in advance.

* * * * *